(12) United States Patent
Wei et al.

(10) Patent No.: US 11,087,626 B2
(45) Date of Patent: Aug. 10, 2021

(54) AUTOMATED VEHICLE CONTROL STRATEGY FOR PEDESTRIAN CROWDS

(71) Applicant: Motional AD LLC, Boston, MA (US)

(72) Inventors: Junqing Wei, Bridgeville, PA (US); Wenda Xu, Pittsburgh, PA (US); Jong Ho Lee, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/532,318

(22) Filed: Aug. 5, 2019

(65) Prior Publication Data

US 2020/0175876 A1    Jun. 4, 2020

Related U.S. Application Data

(63) Continuation of application No. 15/591,680, filed on May 10, 2017, now Pat. No. 10,373,501.

(51) Int. Cl.
*G08G 1/16* (2006.01)
*G05D 1/00* (2006.01)
(Continued)

(52) U.S. Cl.
CPC ......... *G08G 1/166* (2013.01); *B60K 31/0008* (2013.01); *B60Q 1/525* (2013.01);
(Continued)

(58) Field of Classification Search
CPC .... G08G 1/166; G08G 1/09623; B60Q 1/525; B60Q 5/006; B60K 31/0008;
(Continued)

(56) References Cited

U.S. PATENT DOCUMENTS 8,954,252 B1 *  2/2015  Urmson .................. G08G 1/167
                                                                   701/70
10,373,501 B2     8/2019  Wei et al.
(Continued)

OTHER PUBLICATIONS

EP Extended Search Report in European Application No. 18168273. 3, dated Jan. 18, 2019, 11 pages.
(Continued)

*Primary Examiner* — Yazan A Soofi
(74) *Attorney, Agent, or Firm* — Fish & Richardson P.C.

(57) ABSTRACT

A system for operating an automated vehicle in a crowd of pedestrians includes an object-detector, optionally, a signal detector, and a controller. The object-detector detects pedestrians proximate to a host-vehicle. The signal-detector detects a signal-state displayed by a traffic-signal that displays a stop-state that indicates when the host-vehicle should stop so the pedestrians can cross in front of the host-vehicle, and displays a go-state that indicates when the pedestrians should stop passing in front of the host-vehicle so that the host-vehicle can go forward. The controller is in control of movement of the host-vehicle and in communication with the object-detector and the signal-detector. The controller operates the host-vehicle to stop the host-vehicle when the stop-state is displayed, and operates the host-vehicle to creep-forward after a wait-interval after the traffic-signal changes to the go-state when the pedestrians fail to stop passing in front of the host-vehicle.

8 Claims, 2 Drawing Sheets

(51) Int. Cl.
  *B60W 30/08* (2012.01)
  *G06K 9/00* (2006.01)
  *B60K 31/00* (2006.01)
  *B60Q 5/00* (2006.01)
  *B60W 30/09* (2012.01)
  *G08G 1/0962* (2006.01)
  *G08G 1/0967* (2006.01)
  *B60Q 1/52* (2006.01)
  *G05D 1/02* (2020.01)

(52) U.S. Cl.
  CPC ............ *B60Q 5/006* (2013.01); *B60W 30/08* (2013.01); *B60W 30/09* (2013.01); *G05D 1/0055* (2013.01); *G05D 1/0088* (2013.01); *G05D 1/0223* (2013.01); *G06K 9/00805* (2013.01); *G06K 9/00825* (2013.01); *G08G 1/09623* (2013.01); *G08G 1/096783* (2013.01); *G08G 1/165* (2013.01); *B60W 2554/00* (2020.02); *B60W 2555/60* (2020.02); *G06K 9/00369* (2013.01); *G06T 2207/30252* (2013.01); *G06T 2207/30261* (2013.01)

(58) Field of Classification Search
  CPC ... B60W 30/09; G05D 1/0055; G05D 1/0088; G05D 1/0223; G06K 9/00805; G06K 9/00825
  USPC ......................................................... 701/301
  See application file for complete search history.

(56) References Cited

U.S. PATENT DOCUMENTS

| | | | |
|---|---|---|---|
| 2015/0025787 A1* | 1/2015 | Lehner | B60Q 9/008 701/301 |
| 2015/0336502 A1* | 11/2015 | Hillis | G06F 3/017 701/23 |
| 2018/0004211 A1* | 1/2018 | Grimm | G05D 1/0214 |
| 2018/0328418 A1* | 11/2018 | Reimchen | F16C 19/463 |
| 2018/0329418 A1 | 11/2018 | Baalke et al. | |
| 2018/0330617 A1* | 11/2018 | Wei | G05D 1/0223 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

Hurwitz et al., "Improved pedestrian safety at signalized intersections operating the flashing yellow. arrow," Apr. 2013, No. OTREC-RR-13-02. Portland, OR, Transportation Research and Education Center (TREC) https://dx.doi.org/10.15760/trec.70, 81 pages.

* cited by examiner

AUTOMATED VEHICLE CONTROL STRATEGY FOR PEDESTRIAN CROWDS

CROSS-REFERENCE TO RELATED APPLICATION

This application is a continuation of and claims priority to U.S. patent application Ser. No. 15/591,680, filed May 10, 2017, the entire contents of which are incorporated herein by reference.

TECHNICAL FIELD OF INVENTION

This disclosure generally relates to a system for operating an automated vehicle in a crowd of pedestrians, and more particularly relates to a system that operates a host-vehicle to creep-forward when as crowd of pedestrians continues to pass in front of the host-vehicle for longer than a wait-interval.

BACKGROUND OF INVENTION

Automated vehicles have been configured or programmed to stop and wait when pedestrians cross a roadway or travel-path forward of the vehicle. However, if a large crowd is the source of a steady stream of pedestrians crossing a roadway where there are no traffic-signals (e.g. walk/don't walk signals) to control the flow of pedestrians, or the pedestrians are crossing at a location that is not a designated cross-walk, or the pedestrians choose to ignore traffic signals at a designated cross-walk, an automated vehicle could be stopped for an indefinite amount of time, which could cause a traffic jam or otherwise undesirably disrupt the flow of vehicle traffic.

SUMMARY OF THE INVENTION

Described herein automated vehicle control system that includes provisions for moving an automated vehicle, e.g. a host-vehicle, through a crowd of pedestrians that are unreasonably obstructing the movement of the host-vehicle and any other-vehicles following the host-vehicle.

In accordance with one embodiment, a system for operating an automated vehicle in a crowd of pedestrians is provided. The system includes an object-detector and a controller. The object-detector detects pedestrians proximate to a host-vehicle. The controller is in control of movement of the host-vehicle and is in communication with the object-detector. The controller operates the host-vehicle to stop the host-vehicle when pedestrians pass in front of the host-vehicle, and operates the host-vehicle to creep-forward after a wait-interval when the pedestrians continue to pass in front of the host-vehicle.

In another embodiment, a system for operating an automated vehicle in a crowd of pedestrians is provided. The system includes an object-detector, a signal detector, and a controller. The object-detector detects pedestrians proximate to a host-vehicle. The signal-detector detects a signal-state displayed by a traffic-signal. The traffic-signal displays a stop-state that indicates when the host-vehicle should stop so the pedestrians can cross in front of the host-vehicle, and displays a go-state that indicates when the pedestrians should stop passing in front of the host-vehicle so that the host-vehicle can go forward on a path that is free from pedestrians. The controller is in control of movement of the host-vehicle and in communication with the object-detector and the signal-detector. The controller operates the host-vehicle to stop the host-vehicle when the stop-state is displayed, and operates the host-vehicle to creep-forward after a wait-interval after the traffic-signal changes to the go-state when the pedestrians fail to stop passing in front of the host-vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
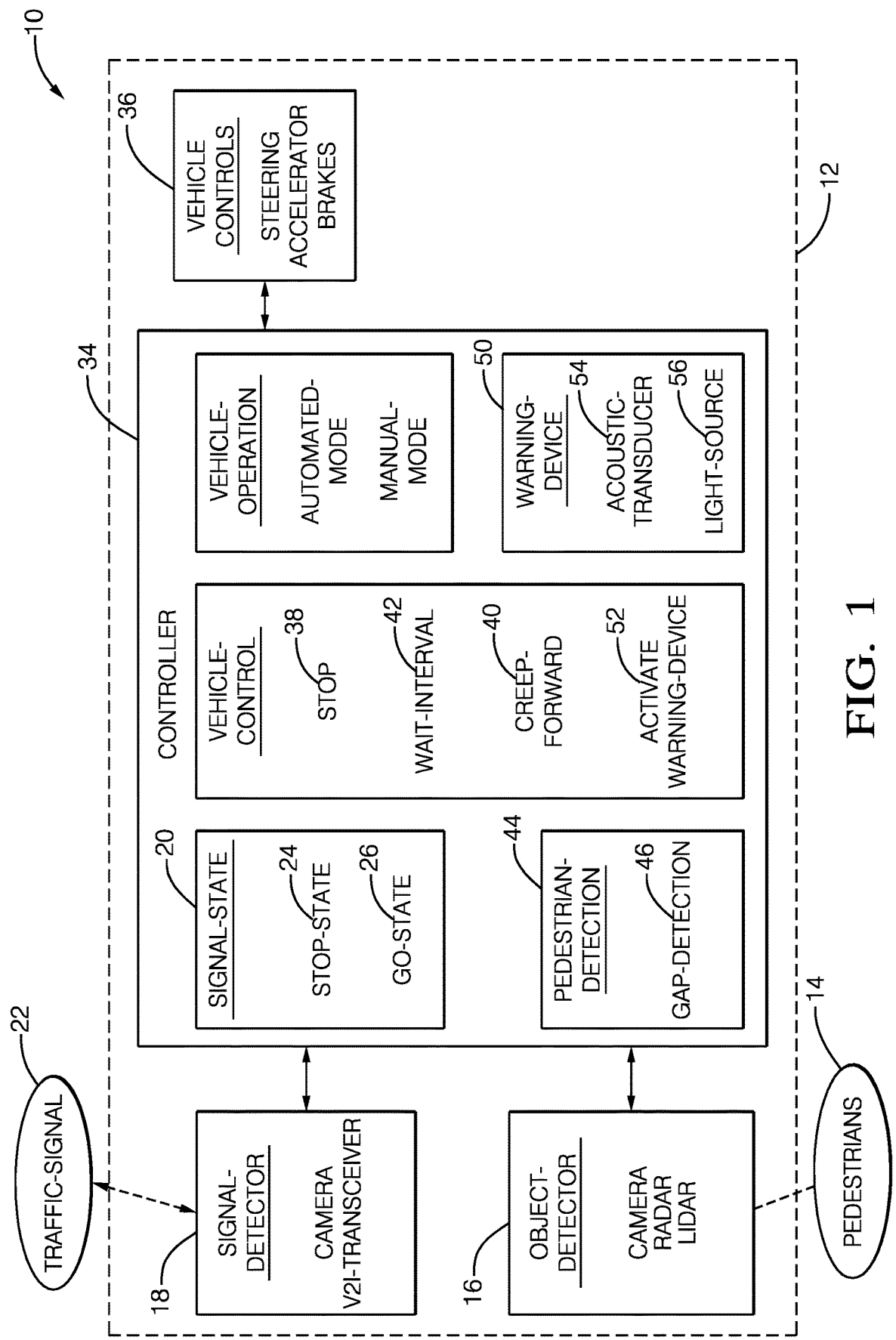
FIG. 1 is a diagram of system for operating an automated vehicle in a crowd of pedestrians in accordance with one embodiment.

FIG. 1 illustrates a non-limiting example of a system 10 for operating an automated vehicle, for example a host-vehicle 12, in or near a crowd or group of pedestrians 14, that are blocking the host-vehicle 12 from moving, e.g. preventing the host-vehicle 12 from proceeding forward. As used herein, the term automated vehicle may apply to instances when the host-vehicle 12 is being operated in an automated-mode, i.e. a fully autonomous mode, where a human-operator of the host-vehicle 12 may do little more than designate a destination in order to operate the host-vehicle 12. However, full automation is not a requirement. It is contemplated that the teachings presented herein are useful when the host-vehicle 12 is operated in a manual-mode where the degree or level of automation may limited to the system 10 operating the accelerator and brakes to proceed safely through the pedestrians 14 that may be located, for example, forward of the host-vehicle 12.

The system 10 includes an object-detector 16 that detects the pedestrians 14 when they are proximate to a host-vehicle 12. The object-detector 16 may include any one of or combination of, but is not limited to, a camera, a radar, and/or a lidar. As will be recognized by those in the art, these devices do not need to be co-located as one interpretation of FIG. 1 might suggest. That is, it is contemplated that the object-detector 16 could have multiple instances of any of the devices positioned at distributed locations about the host-vehicle.

Optionally, the system 10 may include a signal-detector 18 that detects a signal-state 20 displayed by a traffic-signal 22. The signal-detector 18 may include any one of or combination of, but is not limited to, a camera and or a vehicle-to-infrastructure transceiver (V2I-transceiver). If the signal-detector 18 and the object-detector 16 both include or make use of a camera, the camera may be shared the signal-detector 18 and the object-detector 16, or separate cameras with specialized field of view and resolutions may be used for each application.

The traffic-signal 22 may be simply a stop-sign or flashing-red-light, or a red/yellow/green type of traffic-light typically found at intersections of roadways. The traffic-signal may optionally include a wall/don't walk type of signal directed to the pedestrians 14, or the pedestrians 14 may need to refer to the red/yellow/green type of traffic-light to determine when the pedestrians 14 are authorized to proceed across a roadway or travel path of the host-vehicle 12. That is, the traffic-signal 22 may be configured to display a stop-state 24 (e.g. a red light directed toward the host-vehicle 12) that indicates when the host-vehicle 12 should stop so the pedestrians 14 can cross in front of the host-vehicle 12, and display a go-state 26 (e.g. a green light directed toward the host-vehicle 12) that indicates when the pedestrians 14 should wait and stop passing in front of the host-vehicle 12 so that the host-vehicle 12 can go forward on a path or roadway or travel-lane that is free from the pedestrians 14.

Figure 2:
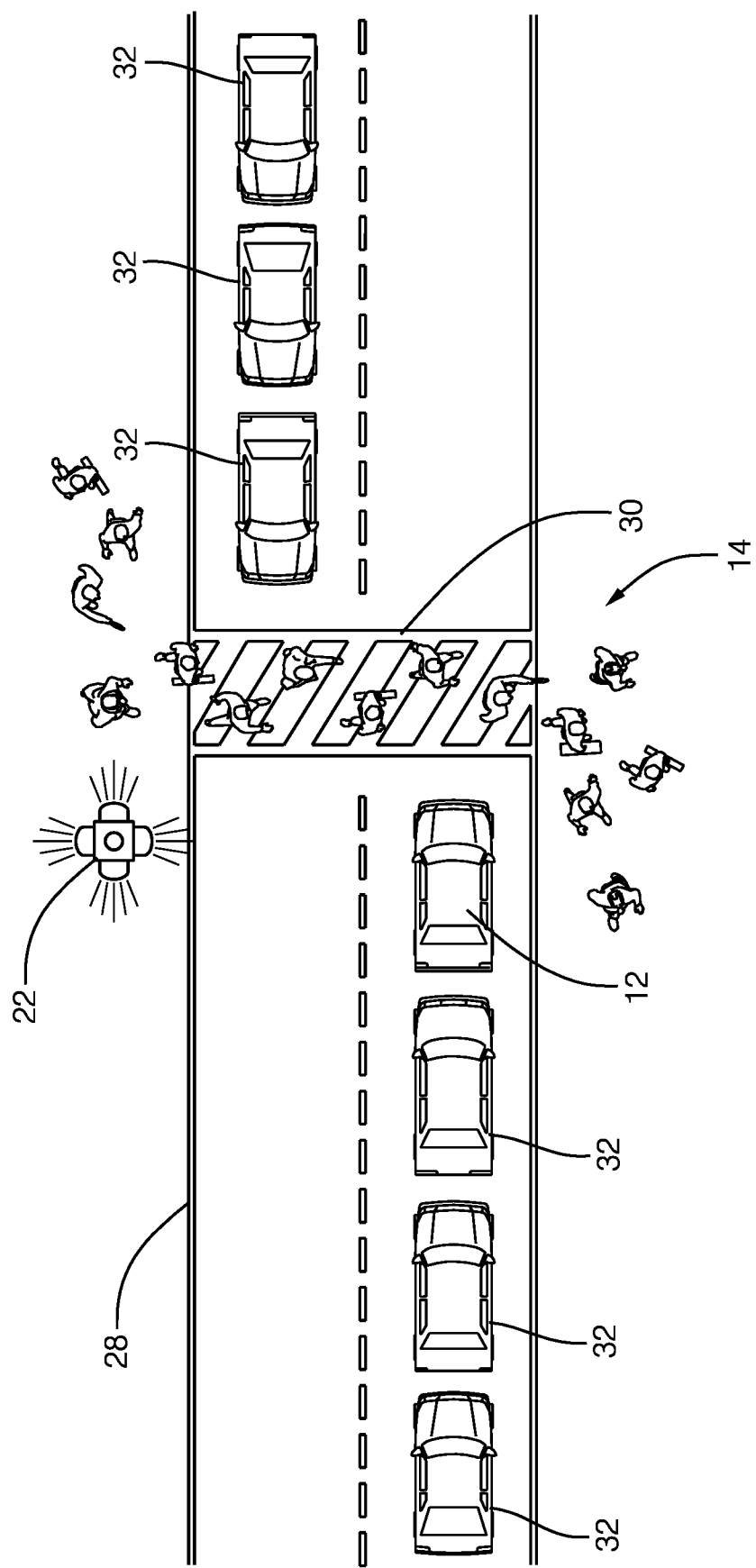
FIG. 2 is a traffic-scenario encountered by the system of FIG. 1 in accordance with one embodiment.

FIG. 2 illustrates a non-limiting example of a roadway 28 where the pedestrians 14 are crossing in front of the host-vehicle 12 and thereby preventing the host-vehicle 12 and other-vehicles 32 on the roadway 28 from moving forward. In this non-limiting example the roadway 28 includes or defines a cross-walk 30; however the presence of the cross-walk 30 is not necessary for the teachings set forth herein to be useful. That is, the pedestrians 14 could block traffic by crossing the roadway 28 at any location along the roadway 28 and not necessarily at a defined cross-walk.

FIG. 2 also illustrates a non-limiting example of the traffic-signal 22 that has lights directed along the roadway 28 for the control of vehicles on the roadway, and along the cross-walk 30, i.e. perpendicular to the roadway 28 for the control of the pedestrians 14. However, the present of the traffic-signal 22 is not necessary for the teachings set forth herein to be useful. That is, the pedestrians 14 could block traffic by crossing the roadway 28 where there is no traffic-signal for the host-vehicle 12, the other-vehicles 32, or the pedestrians 14 to observe.

Referring back to FIG. 1, the system 10 includes a controller 34 in control of movement of the host-vehicle 12 by way of the vehicle-controls 36. The controller 34 is also in communication with the object-detector 16, and if the system is so equipped, in communication with the signal-detector 18. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for controlling movement of the host-vehicle 12 when the travel-path of the host-vehicle 12 is blocked by the pedestrians 14 based on signals received by the controller 34 as described herein.

The controller 34 is programmed or configured to operate the host-vehicle 12 to stop 38 the host-vehicle 12 when the pedestrians 14 pass in front of the host-vehicle 12. However, instead of being overly courteous which could cause a traffic-backup or traffic-jam, possibly impeding emergency-vehicles (not shown) from reaching their destinations, the controller 34 operates the host-vehicle 12 to creep-forward 40 after a wait-interval 42, e.g. two minutes, when the pedestrians 14 continue to pass in front of the host-vehicle 12. As used herein, creep-forward 40 means that the host-vehicle 12 starts to move forward towards the pedestrians 14 that are blocking the host-vehicle 12, but not in a manner that would cause injury to any of the pedestrians 14. It is expected that the pedestrians 14 will move away from the advancing by the host-vehicle 12, and eventually a break in the stream of the pedestrians 14 will form that will allow the host-vehicle 12 to proceed.

If an instance of the traffic-signal 22 is present, the system 10 may use the changing of the traffic-signal 22 to determine when to start the wait-interval 42. That is, when the system 10 includes the signal-detector 18 and the traffic-signal 22 is present and detected, the controller 34 operates the host-vehicle 12 to stop 38 the host-vehicle 12 when the stop-state 24 is displayed, and operates the host-vehicle 12 to creep-forward 40 after the wait-interval 42 following the changing of the traffic-signal 22 to the go-state 26 when the pedestrians 14 fail to stop passing in front of the host-vehicle 12.

The controller 34 may also be configured to use the object-detector 16 to perform a pedestrian-detection 44, in particular to perform a gap-detection 46, i.e. look for a gap in the pedestrians 14 as an opportunity to move through the pedestrians 14. For example, if the wait-interval 42 has expired, but the gap-detection 46 indicates that a gap in the pedestrians 14 is approaching the area in front of the host-vehicle 12, the system 10 may elect to wait for the gap rather than initiate the creep-forward 40.

The system 10 may also include a warning-device 50 detectable by the pedestrians 14, and the controller 34 may be configured to activate 52 the warning-device 50 when the controller 34 operates the host-vehicle 12 to creep-forward 40. It is contemplated that the warning-device 50 could be an acoustic-transducer 54 that emits an audible beep when activated, where the audible beep is not as loud as a typical horn already available on vehicles. That is, the audible beep will be loud enough to be noticed by the pedestrians 14 near the host-vehicle 12, but not so loud as to scare the pedestrians 14. Alternatively, or in addition to the acoustic-transducer 54, the warning-device 50 may be a light-source 56 that emits a flashing-light when activated.

Accordingly, a system for operating an automated vehicle in a crowd of pedestrians (the system 10), a controller 34 for the system 10, and a method of operating the system 10 is provided. By configuring a host-vehicle 12 to creep-forward 40 towards a crowd of the pedestrians 14, it is expected that the flow of vehicle traffic will be improved, particularly for traffic near entertainment venues such as sports facilities or concert arenas.

While this invention has been described in terms of the preferred embodiments thereof, it is not intended to be so limited, but rather only to the extent set forth in the claims that follow.

We claim:

1. A system for operating an automated vehicle in a crowd of pedestrians, said system comprising:
    an object-detector that detects gaps in pedestrians proximate to a host-vehicle, wherein a gap is an opportunity to move through the pedestrians; and
    a controller in control of movement of the host-vehicle and in communication with the object-detector, said controller operates the host-vehicle to creep-forward after a wait-interval when the pedestrians continue to pass in front of the host-vehicle, and wait for a gap in the pedestrians in response to the gap approaching the host vehicle after the wait-interval.

2. The system in accordance with claim 1, wherein the system includes a warning-device detectable by the pedestrians, said warning-device activated when the controller operates the host-vehicle to creep-forward.

3. The system in accordance with claim 2, wherein the warning-device is an acoustic-transducer that emits an audible beep when activated.

4. The system in accordance with claim 2, wherein the warning-device is a light-source that emits a flashing-light when activated.

5. A system for operating an automated vehicle in a crowd of pedestrians, said system comprising:
- an object-detector that detects gaps in pedestrians proximate to a host-vehicle, wherein a gap is an opportunity to move through the pedestrians;
- a signal-detector that detects a signal-state displayed by a traffic-signal, wherein the traffic-signal displays a go-state that indicates when the pedestrians should stop passing in front of the host-vehicle so that the host-vehicle can go forward on a path that is free from pedestrians; and
- a controller in control of movement of the host-vehicle and in communication with the object-detector and the signal-detector, said controller operates the host-vehicle to creep-forward after a wait-interval after the traffic-signal changes to the go-state when the pedestrians fail to stop passing in front of the host-vehicle and wait for a gap in the pedestrians in response to the gap approaching the host-vehicle after the wait-interval.

6. The system in accordance with claim 5, wherein the system includes a warning-device detectable by the pedestrians, said warning-device activated when the controller operates the host-vehicle to creep-forward.

7. The system in accordance with claim 6, wherein the warning-device is an acoustic-transducer that emits an audible beep when activated.

8. The system in accordance with claim 6, wherein the warning-device is a light-source that emits a flashing-light when activated.

* * * * *